(12) United States Patent
Yue

(10) Patent No.: US 7,314,203 B2
(45) Date of Patent: Jan. 1, 2008

(54) BASE FOR VANITY MIRROR OR OTHER SMALL OBJECT WITH ENHANCED STABILITY AND ROTATIONAL ABILITY

(76) Inventor: Chi Yau Yue, Block 4, Unit 10, 5/F., Profit Industrial Bldg., 1215 Kwai Chung, N.T., Hong Kong (CN)

( * ) Notice: Subject to any disclaimer, the term of this patent is extended or adjusted under 35 U.S.C. 154(b) by 373 days.

(21) Appl. No.: 11/011,941

(22) Filed: Dec. 15, 2004

(65) Prior Publication Data

US 2006/0124818 A1   Jun. 15, 2006

(51) Int. Cl.
*A47B 49/00* (2006.01)

(52) U.S. Cl. .............. 248/349.1; 248/678; 248/131

(58) Field of Classification Search ............ 248/349.1, 248/346.01, 637, 678, 131, 125.7; 211/163, 211/165, 131.1, 47
See application file for complete search history.

(56) References Cited

U.S. PATENT DOCUMENTS

| | | | |
|---|---|---|---|
| 3,930,702 A | 1/1976 | Pichowicz | |
| 4,117,627 A * | 10/1978 | Slingerland, Jr. | .............. 47/39 |
| 4,229,060 A | 10/1980 | Brownlee | |
| 4,239,311 A | 12/1980 | Brownlee | |
| 4,258,966 A | 3/1981 | Grubb | |
| 4,268,125 A | 5/1981 | Carter | |
| 5,685,514 A | 11/1997 | Carnahan | |
| 5,755,420 A * | 5/1998 | Wu et al. | .................... 248/371 |
| 5,782,451 A | 7/1998 | Carnahan | |
| 6,619,742 B1 * | 9/2003 | Bellefleur | .............. 297/344.21 |
| 6,959,901 B2 * | 11/2005 | Chang | ........................ 248/458 |
| 7,028,968 B2 * | 4/2006 | Washick | ..................... 248/521 |
| 2004/0164034 A1 | 8/2004 | Costanza | |

\* cited by examiner

*Primary Examiner*—Carl D. Friedman
*Assistant Examiner*—Steven Marsh
(74) *Attorney, Agent, or Firm*—Eric Hanscom; Todd Langford

(57) ABSTRACT

This invention is directed toward a base for a top object such as a vanity mirror or other small object with enhanced stability and rotational capabilities. The invention is also easy to manufacture, take apart and put back together, and repair as it has only one screw which holds the entire unit together. While designed for a vanity mirror, and number of other items can be mounted on the top of the invention due to its design which includes a threaded opening at its upper portion which can accommodate screw threads from an attached device.

5 Claims, 2 Drawing Sheets

BASE FOR VANITY MIRROR OR OTHER SMALL OBJECT WITH ENHANCED STABILITY AND ROTATIONAL ABILITY

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

This invention is directed toward a base for a top object such as a vanity mirror or other small object with enhanced stability and rotational capabilities. The invention is also easy to manufacture, take apart and put back together, and repair as it has only one screw which holds the entire unit together. While designed for a vanity mirror, and number of other items can be mounted on the top of the invention due to its design which includes a threaded opening at its upper portion which can accommodate screw threads from an attached device.

Mirrors have been used by people for over 2,000 years. While mirrors began as handheld items a person would use to look at himself or herself, inventions were made which allowed a user to set the mirror on a cabinet or other flat object so that the user could use both hands to comb hair, brush teeth or perform other acts which are easier to perform with a stable mirror rather than one moving around in a user's hand which the user is doing an action, such as combing hair or brushing teeth, which would cause the mirror to jiggle and prevent a user from getting a good view due to the movement of the mirror.

Over time, users began to realize that having a mirror that would rotate easily would be an improvement over a mirror which merely sat on the surface.

Another problem that plagued vanity mirrors and other small objects that are traditionally used in bathrooms and bedrooms is that they can be unstable due to the constraints of trying to design a product such as a vanity mirror which has a relatively large and heaving top object towering over a base which has to be relatively small for cosmetic means.

The prior art has several examples of attempts to resolve this problem. For example, the concept of using ball bearings to effectuate rotation of an object above a base is not new, as evidenced by U.S. Pat. Nos. 5,685,514 and 5,782,451 to Carnahan. These patents, however, do not allow for a stabilizing base weight nor do they teach an attractive, decorative cover to hide the inner workings of the rotational aspect of the invention. The idea of rotating mirrors is also not new. U.S. Pat. No. 4,268,125 to Carter teaches a pivoting blind-side mirror for an automobile or truck. This patent, however, pivots but does not rotate as does the current invention and is for a completely different type of use. Rotating cabinets are also present in the prior, including U.S. Pat. Nos. 4,258,966 to Grubb, and 4,229,060 and 4,239,311 to Brownlee. These inventions combine a variety of storage devices with a rotating base relying upon ball bearings for the rotation, but none teach the use of a base weight for stability. Examples of jewelry cabinets, which are one of the possible top objects which can be secured to the rotating base taught by this invention can be found in U.S. Pat. No. 3,930,702 to Pichowicz and US published application No. 2004/0164034 A1 to Costanza, neither of which teaches a rotating base as does the present invention.

Thus there has existed a long-felt need for a base upon which can be mounted a top object such as a vanity mirror, which is both stable and allows for the top object to be rotated.

The current invention provides just such a solution by having a base for a top object such as a vanity mirror or other small object with enhanced stability and rotational capabilities. The invention is also easy to manufacture, take apart and put back together, and repair as it has only one screw which holds the entire unit together. While designed for a vanity mirror, and number of other items can be mounted on the top of the invention due to its design which includes a threaded opening at its upper portion which can accommodate screw threads from an attached device.

SUMMARY OF THE INVENTION

It is a principal object of the invention to provide a base which can adequately support a top object, such as a vanity mirror.

It is another object of the invention that the top object is allowed to rotate freely.

It is an additional object of the invention that the invention is easy to assemble and take apart due to its reliance on only one screw and one threaded top ring to secure all the parts of the invention together.

It is a final object of this invention that it is relatively inexpensive to manufacture based on the simplicity of its design and the small number of parts.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE FIGURES

This invention, as illustrated by the figures, is a base for a top object such as a vanity mirror or other small object with enhanced stability and rotational capabilities. The invention is also easy to manufacture, take apart and put back together, and repair as it has only one screw which holds the entire unit together. While designed for a vanity mirror, and number of other items can be mounted on the top of the invention due to its design which includes a threaded opening at its upper portion which can accommodate screw threads from an attached device.

Figure 1:
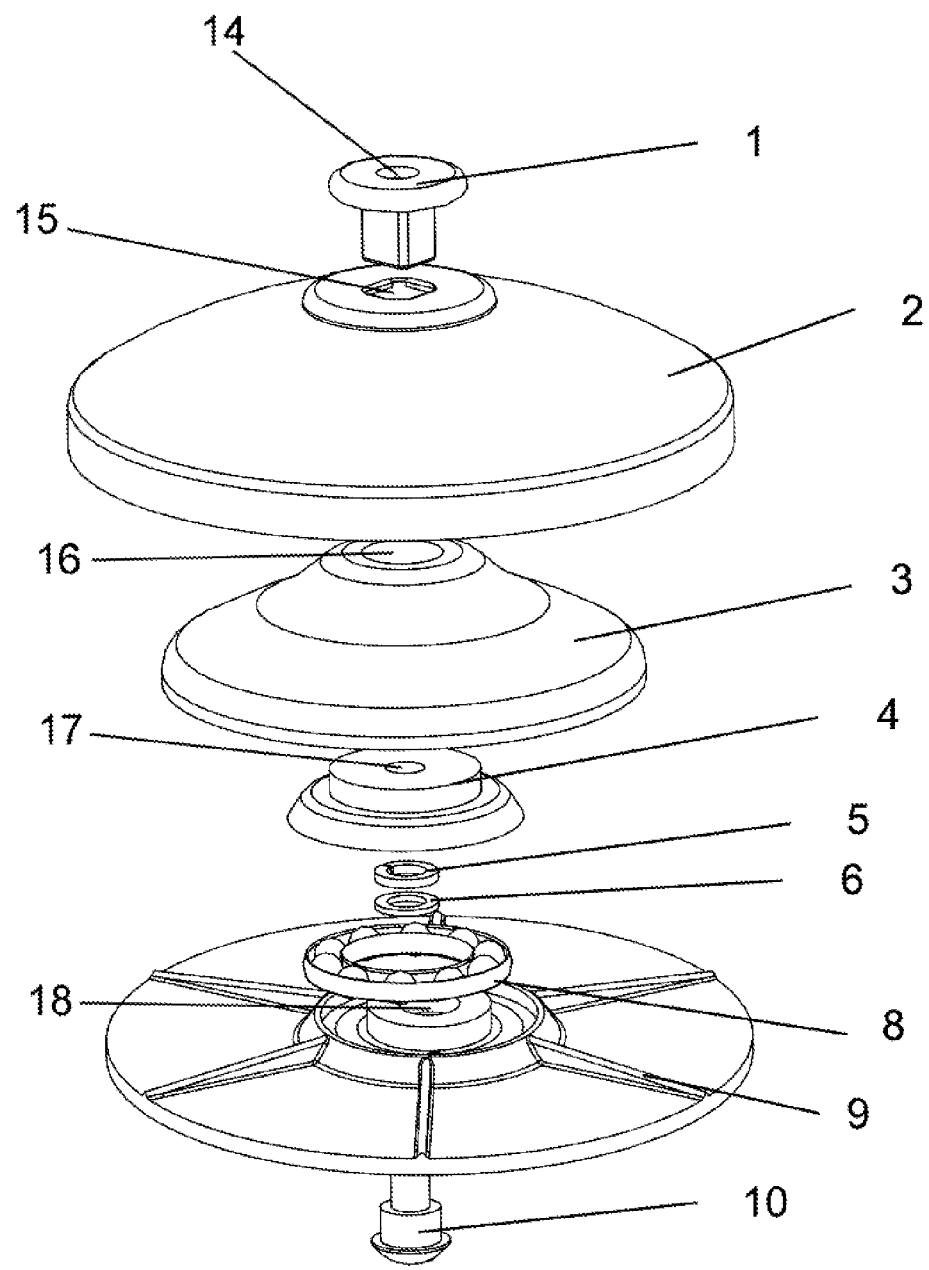
FIG. 1 is an elevational view of the invention in exploded view showing the various parts and how they fit together.

Turning to the illustrations, FIG. 1 is an elevational view of the invention in exploded view showing the various parts and how they fit together. The uppermost part of the invention is a top ring (1) which has a shaft hole (14) through its center, which, as with all the shaft holes in this invention, is only slightly larger than a locking screw shaft, discussed later, an upper lip which is a circular enlarged portion with a diameter larger than that of the shaft hole (14) such that the top ring (1) cannot be pulled through the lower parts through the shaft hole (14) of the top ring. The bottom portion of the top ring is, in this iteration, square, such that, when fit into a square cavity in an upper shell (2), located just below the top ring (1) prevents the top ring (1) from rotating around. Below the top ring is the upper shell (2), which is a slightly conical covering piece which is decoratively ornamented such that it serves as an attractive cover of the inner workings of the invention. The upper shell (2) also has a shaft hole (15) and an outer lip which extends down from the outer diameter of the upper shell (2). Beneath the upper shell (2) is a base weight (3), which is a conical piece of metal or dense plastic which has a fairly narrow and thin upper part, through which there is a shaft hole (16), and a much wider and thicker lower portion, which serves as a weight on the invention to keep it stable. Because the lower portion of the base weight hangs substantially lower than the upper portion, there is created a low center of gravity with further assists the stabilizing function of the invention. Beneath the base weight (3) is a bearing location plate (4), through which there is also a shaft hole (17). The bearing location plate (4) serves as the top part of a sandwich which restrains a plurality of bearings (7) in a bearing tray (8) over the bottom portion of the sandwich, which is a lower supporting plate (9). The bearing location plate (4) has a bottom section which extends out from the shaft hole (17) and curves down to "lock in" the bearing tray. Beneath the bearing location plate (4) is a spring ring (5) and a ring (6) which serve to allow for enhanced rotation along with providing a mechanism by which any slack between the top ring (1) and a locking screw (10) can be taken up. Beneath the bearing location plate (4) is the bearing tray (8) which is a circular container with a flat bottom and an inner raised side and an outer raised side which contain a plurality of bearings (7) which can rotate freely within the bearing tray (8). The bearing tray (8) rests in a circular cavity manufactured into the lower supporting plate (9). The lower supporting plate (9) is a metal or heavy plastic, flat, plate which has a diameter only slightly smaller than the diameter of the upper shell (2), such that when the invention is assembled the outer lip of the upper shell (2), neatly fits over the outer upward lip of the lower supporting plate (9). The lower supporting plate (9) has, optionally, support struts which radiate out from the shaft hole in the lower supporting plate (9). The bottom of the lower supporting plate (9) is flat, except for an indentation slightly larger that a head of the locking screw (10) and slightly deeper than the height of the locking screw (10), such that the head of the locking screwing (10) fits snugly into the cavity, not shown in this figure, in the bottom of the lower supporting plate (9). The cavity in the lower supporting plate (9) also has an enlarged shaft section (18), into which an enlarged shaft portion of the locking screw (10) fits and is allowed to rotate. The locking screw (10) extends from the bottom of the lower supporting plate (9) up through all the shaft holes, the spring ring (5), and the ring (6), eventually reaching the top ring, where a series of threads in the threaded portion of the locking screw mates into threads in the lower portion of the top ring. By turning the locking screw (10) until it snugly pulls down the top ring (1) on the other parts of the invention, a stable but rotatable base is created.

Figure 2:
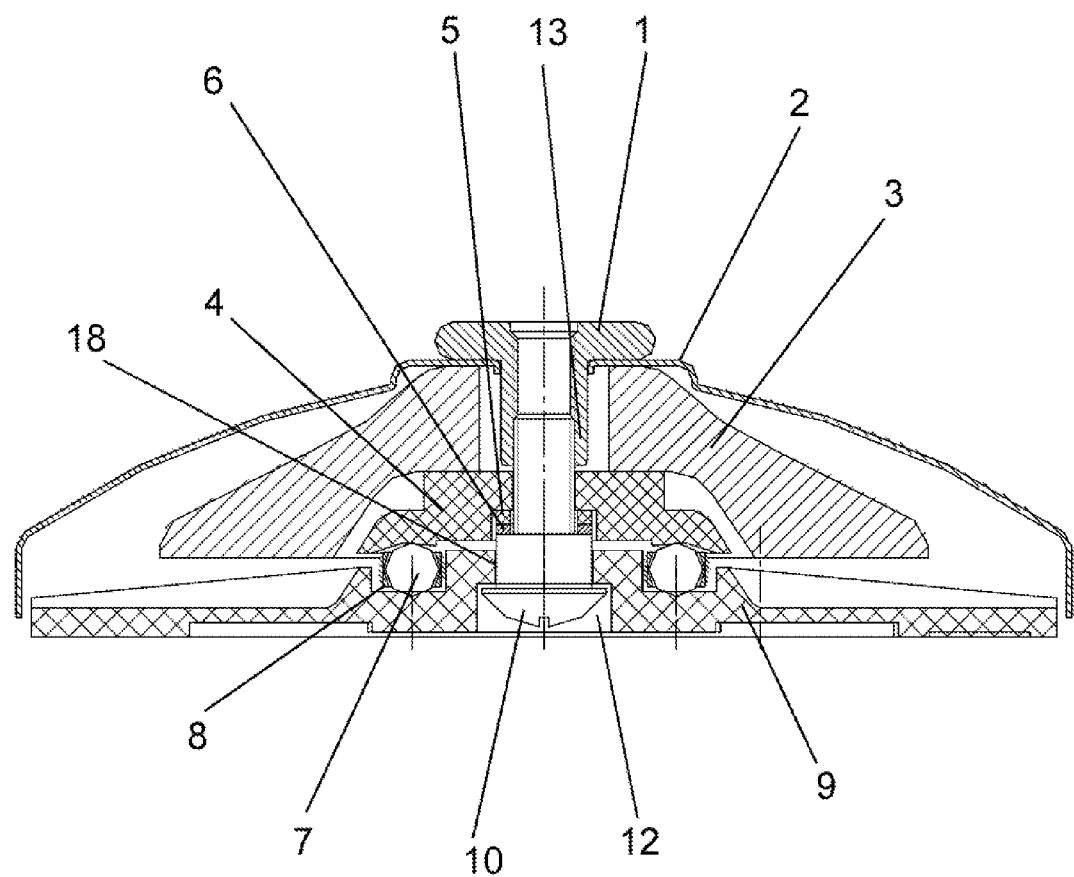
FIG. 2 is a side, cut-away view of the invention fully assembled, showing how each part fits with the other parts to create a working weight, rotational base for a top object such as a vanity mirror.

Turning to FIG. 2 the invention is illustrated by a side, cut-away view of the invention fully assembled, showing how each part fits with the other parts to create a working weight, rotational base for a top object such as a vanity mirror. In this iteration, the locking screw (10) will screw directly into a top object (not shown in this iteration), thereby compressing the various parts of the invention together by pulling the top object down on the assembly. The different parts of the invention appear in the same order as in FIG. 1, but in normal positions, starting at the top with the top ring (1), which sits over the upper shell (2), followed, in sequence from top to bottom, the base weight (3), the bearing location plate (4), the spring ring (5), the ring (6), the bearings (7), the bearing tray (8), the lower supporting plate (9) and the locking screw (10). The bottom of the lower supporting plate (9) is flat, except for an indentation slightly larger that a head of the locking screw (10) and slightly deeper than the height of the locking screw (10), such that the head of the locking screwing (10) fits snugly into the cavity (12) in the bottom of the lower supporting plate (9). The cavity (12) in the lower supporting plate (9) also has an enlarged shaft section (18), into which an enlarged shaft portion of the locking screw (10) fits and is allowed to rotate. The locking screw (10) extends from the bottom of the lower supporting plate (9) up through all the shaft holes, the spring ring (5), and the ring (6), eventually reaching the top ring, where a series of threads in the threaded portion of the locking screw mates into threads in the lower portion of the top ring (13). By turning the locking screw (10) until it snugly pulls down the top ring (1) on the other parts of the invention, a stable but rotatable base is created.

I claim:

1. A device for attachment to, stabilization of, and rotation of a vanity mirror or other small device, comprising:
   A. a locking screw with a head, a shaft, and a threaded portion,
   B. a lower supporting plate,
   C. a plurality of bearings in a bearing tray,
   D. a ring,
   E. a ring spring,
   F. a bearing location plate,
   G. a base weight,
   H. an upper shell, and
   I. a top ring with a lower end and an upper end,
   where, the lower supporting plate, the bearing tray, the ring, the ring spring, the bearing location plate, the base weight, and the upper shell all have a hole in their center which is of a diameter slightly larger than the diameter of the threaded portion of the screw, thereby securing a snug fit between the shaft of the locking screw and the lower supporting plate, the bearing tray, the ring, the ring spring, the bearing location plate, the base weight, and the upper shell,
   where, the head of the locking screw is larger than the hole in the lower supporting plate such that the locking screw cannot pull through the lower supporting plate, and,
   where the lower supporting plate has built into the top of it a circular cavity such that the circular cavity is in the shape of a ring, with a flat circular bottom and a vertical side, and where the bearing tray fits and is secured into this circular cavity, and,
   where, the lower supporting plate is manufactured such that it has on its underside a cavity into which the head of the locking screw fits snugly, and
   where, the top ring has a threaded portion on its upper end which can receive a vanity mirror, jewelry stand, or other small object, and a lower end which is threaded such that it can receive the threaded portion of the locking screw, and, where, the locking screw threads into the top ring, sandwiching in between the individual components in the following order, starting from the head of the locking screw at the bottom of the device which rests on a table, dresser, or other flat surface, moving up toward the top ring: locking screw, lower supporting plate, bearing tray, bearings, ring, spring ring, bearing location plate, base weight, upper shell, top ring.

2. The device of claim 1, where, the base weight is a roughly conical unit with a small top portion which rests on top of the bearing location plate and larger, wider, and substantially heavier portion which descends downward and outward from the small top portion, with the thickest and therefore heaviest portion hanging at a level nearly touching the lower supporting plate such that the center of gravity of the device is substantially lower than it would be had the base weight been merely a solid, flat block extending only horizontally above the bearing location plate.

3. The device of claim 2, where, the distance between the bottom of the base weight and the top of the lower supporting plate is between 1 and 10 millimeters.

4. The device of claim 2, where, the distance between the bottom of the base weight and the top of the lower supporting plate is between 1 and 3 millimeters.

5. The device of claim 2, where, the bottom portion of the top ring is square and the hole in the upper shell is also square, thereby preventing rotation of the device by means other than movement of the bearings, such that the invention cannot rotate about the threads attaching the locking screw to the top ring, thereby loosening the top ring and allowing a top object such as a vanity mirror or other object attached to the upper end of the top ring, allowing the top object to fall off the device.

* * * * *